Patented Dec. 9, 1941

2,265,934

UNITED STATES PATENT OFFICE 2,265,934

FERRIC GUANIDINE OXALATE AND A PROCESS OF MAKING IT

Robert Bowling Barnes, Stamford, Conn., assignor to American Cyanamid Company, New York, N. Y., a corporation of Maine No Drawing. Application September 9, 1939, Serial No. 294,219

6 Claims. (Cl. 260—439)

This invention relates to a photosensitive composition consisting of essentially ferric oxalate and guanidine oxalate, either in aqueous solution or in the form of double salts which can be separated therefrom. Although guanidine oxalate and ferric oxalate are only slightly sensitive to light I have found that an aqueous solution containing the two salts is extremely photosensitive. I have also found that a solution containing these salts, that is to say, a solution containing ferric iron, guanidine and oxalic acid radicals, can be made to deposit a double salt in the form of well-defined crystals having definite and reproducible characteristics. These crystals are also very photosensitive and should be kept away from actinic light.

The double salt, when separated from the above described solution in the absence of actinic light, is ferric guanidine oxalate, a yellow-green crystalline salt corresponding to the empirical formula $$[CNH(NH_2)_2.H]_3.Fe(C_2O_4)_3$$

but containing a slight excess of oxalic acid. The crystals ordinarily contain 1 molecule of water of hydration, so that the empirical formula is ordinarily $$[CNH(NH_2)_2.H]_3Fe(C_2O_4)_3.H_2O$$

These crystals are sharply photosensitive, their ferric content being reduced to the ferrous form on activation by actinic light. The molecular weight of the compound is 518.

Both ferric guanidine oxalate and the aqueous solutions from which it is obtainable have remarkable properties in the field of photographic reproduction such as, for example, in blueprint coatings. I have found that solutions containing these materials will contribute greatly to the stability of blueprint coatings when used to replace such photosensitive materials as ferric ammonium oxalate, ferric citrate and the like in whole or in part. Unexposed blueprint coatings containing ferric guanidine oxalate, as well as other coatings obtained from solutions of ferric oxalate and guanidine oxalate have been stored at room temperature for more than 50 days under adverse conditions of humidity and temperature without appreciable deterioration. Samples of coatings stored for this period could be completely washed off, which is proof of a complete absence of autoreduction. Such coatings will therefore produce blueprints having clear white backgrounds.

The process whereby the photosensitive solutions and the photosensitive ferric guanidine oxalate crystals are prepared constitutes another important feature of the invention. These materials are heat sensitive as well as light sensitive and therefore elevated temperatures should be avoided. Red precipitates have been observed when the temperature of the solution was raised to 50° C., and temperatures well below this point are recommended.

Preferably a solution containing ferric iron, guanidine and oxalic acid is prepared by mixing an aqueous solution of ferric oxalate with an aqueous solution of guanidine oxalate containing a slight excess of the oxalic acid radical, the mixing being carried out in the cold and in the absence of actinic light. To prepare the green crystals of ferric guanidine oxalate, the double salt is then crystallized from the resulting aqueous solution of the two components, still in the absence of actinic light. The crystallization may be carried out by cooling the solution, or by evaporation of the solution by blowing with a current of air at 30° C. or less, or by vacuum evaporation of water at low temperatures or by any other suitable means such as a combination of cooling and water evaporation. Alternatively, the double salt may be separated by adding an organic precipitant such as acetone in substantial quantities.

The invention will be illustrated in greater detail by the following specific example to which, however, it is not limited.

Example 18 parts by weight of guanidine carbonate are dissolved in 50 parts of water and the solution is filtered. 12.6 parts of oxalic acid are then added and the solution is gently boiled to expel carbon dioxide. As will be shown by the analysis below, this solution contains a slight excess of the oxalic acid radical. The solution is then cooled to room temperature and filtered.

12.5 parts by weight of ferric oxalate are dissolved in 50 parts of hot water, agitated for complete solution, cooled to room temperature, and filtered. The ferric oxalate solution is then mixed with the guanidine oxalate solution without heating and in the absence of actinic light. It will be noted that the resulting aqueous solution contains ferric oxalate and guanidine oxalate in substantially the ratio of ⅓ mole of ferric oxalate for each mole of guanidine oxalate.

The resulting solution is evaporated, under dark-room conditions, by blowing with a current of air at less than 30° C. This method of evaporation is particularly valuable in obtaining a high grade material because it insures the maintenance of low temperatures. After sufficient evaporation the liquor is preferably cooled to 8° C., at which temperature a maximum separation of pure crystals will take place. The crystals are separated from the mother liquor by filtration or other suitable means and the filtrate is preferably further cooled to 5° C. to obtain a second crop of crystals.

The ferric guanidine oxalate is obtained by the above process as a yellow-green crystalline salt, the crystals of which are members of the prismatic system and have domatic ends. Their specific gravity is sharp and lies between 1.685 and 1.710. The refractive indices are $n_1$, ca. 1.496
$n_2$, ca. 1.588
$n_3$, ca. 1.677

They are sharply photosensitive, the ferric content being reduced to the ferrous form on activation by actinic light. The color of the activated compound ranges from red-brown to brown, depending on the degree and speed of activation. A solution of 1 gram of these crystals in 100 ml. of water had a pH of 3.32 and a potential value of +0.08 volt at 25° C. The analysis of the crystals is shown in the following table

| Component | Percentage | | Ratio |
| --- | --- | --- | --- |
| | Theoretical | Determined | Det'd./theor. |
| Nitrogen (N) | 25.2 | 24.15 | 95.83 |
| Iron (Fe) | 11.2 | 10.74 | 95.89 |
| Oxalate ($C_2O_4$) | 52.8 | 51.23 | 97.02 |

The empirical formula is therefore as follows:

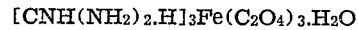
$[CNH(NH_2)_2.H]_3Fe(C_2O_4)_3.H_2O$

From an inspection of the nitrogen and iron ratios, it is evident that the product contains approximately 95.8% of anhydrous ferric guanidine oxalate. Including one mol of water of crystallization the purity is 99.2%. It is evident from the analysis that the remaining 0.8% was due to a slight excess of oxalic acid in the guanidine oxalate, and that the empirical formula as shown is correct.

What I claim is:

1. Ferric guanidine oxalate.

2. A double salt of ferric oxalate and guanidine oxalate which when water of hydration is neglected corresponds substantially to the empirical formula $[CNH(NH_2)_2.H]_3Fe(C_2O_4)_3$.

3. Ferric guanidine oxalate monohydrate, being a yellow-green, crystalline, photosensitive salt having a specific gravity of 1.685 to 1.710 and corresponding substantially to the empirical formula $[CNH(NH_2)_2.H]_3Fe(C_2O_4)_3.H_2O$.

4. A solution containing ferric iron, guanidine and oxalic acid radicals, characterized by its ability to deposit yellow-green crystals of ferric guanidine oxalate monohydrate upon cooling or evaporation in the absence of actinic light.

5. A method of preparing ferric oxalate and guanidine oxalate which comprises mixing an aqueous solution of ferric oxalate which an aqueous solution of guanidine oxalate containing a slight excess of oxalic acid radical in the absence of actinic light and crystallizing a double salt from the mixture in the absence of actinic light.

6. A method of preparing a ferric guanidine oxalate which comprises preparing, in the absence of actinic light, an aqueous solution containing ferric oxalate and guanidine oxalate in substantially the ratio of ⅓ mole of ferric oxalate for each mole of guanidine oxalate and separating a double salt from the mixture in the absence of actinic light.

ROBERT BOWLING BARNES.